(12) United States Patent
Siddiqui

(10) Patent No.: US 9,624,019 B2
(45) Date of Patent: Apr. 18, 2017

(54) HIGH OXYGEN AND WATER BARRIER MULTILAYER FILM

(71) Applicant: Winpak Films, Inc., Senoia, GA (US)

(72) Inventor: Aamir Siddiqui, Naperville, IL (US)

(73) Assignee: Winpak Films Inc., Senoia, GA (US)

( * ) Notice: Subject to any disclaimer, the term of this patent is extended or adjusted under 35 U.S.C. 154(b) by 549 days.

(21) Appl. No.: 14/074,949

(22) Filed: Nov. 8, 2013

(65) Prior Publication Data

US 2014/0134446 A1    May 15, 2014

Related U.S. Application Data

(60) Provisional application No. 61/724,329, filed on Nov. 9, 2012.

(51) Int. Cl.
| | | |
|---|---|---|
| B32B 27/30 | (2006.01) | |
| B32B 27/32 | (2006.01) | |
| B32B 27/34 | (2006.01) | |
| B65D 81/18 | (2006.01) | |
| B32B 27/08 | (2006.01) | |

(52) U.S. Cl.
CPC .............. *B65D 81/18* (2013.01); *B32B 27/08* (2013.01); *B32B 27/306* (2013.01); *B32B 27/32* (2013.01); *B32B 27/327* (2013.01); *B32B 27/34* (2013.01); *B32B 2250/05* (2013.01); *B32B 2250/24* (2013.01); *B32B 2270/00* (2013.01); *B32B 2307/702* (2013.01); *B32B 2307/7145* (2013.01); *B32B 2307/726* (2013.01); *B32B 2307/7244* (2013.01); *B32B 2307/758* (2013.01); *B32B 2439/06* (2013.01); *B32B 2439/70* (2013.01); *Y10T 428/3175* (2015.04)

(58) Field of Classification Search
CPC ..... B32B 27/306; B32B 27/32; B32B 27/327; B32B 27/34
See application file for complete search history.

(56) References Cited

U.S. PATENT DOCUMENTS

| | | | | |
|---|---|---|---|---|
| 3,980,605 | A * | 9/1976 | Steigelmann | B01D 61/38 210/500.23 |
| 4,064,296 | A | 12/1977 | Bornstein et al. | |
| 4,188,443 | A | 2/1980 | Mueller et al. | |
| 4,254,169 | A * | 3/1981 | Schroeder | B32B 27/08 428/36.6 |
| 4,467,084 | A | 8/1984 | Kitagawa et al. | |
| 4,469,742 | A | 9/1984 | Oberle et al. | |
| 4,611,019 | A * | 9/1986 | Lutzmann | C08K 5/0016 524/104 |
| 4,755,402 | A | 7/1988 | Oberle et al. | |
| 4,755,419 | A | 7/1988 | Shah et al. | |
| 4,758,463 | A | 7/1988 | Vicik et al. | |
| 4,770,944 | A | 9/1988 | Farrell et al. | |
| 4,792,488 | A | 12/1988 | Schirmer et al. | |
| 4,828,915 | A * | 5/1989 | Schroeder | B32B 27/08 264/173.19 |
| 4,883,693 | A | 11/1989 | Ohya et al. | |
| 4,911,979 | A | 3/1990 | Nishimoto et al. | |
| 5,079,051 | A | 1/1992 | Garland et al. | |
| 5,283,128 | A | 2/1994 | Wilhoit et al. | |
| 5,336,549 | A | 8/1994 | Nishimoto et al. | |
| 5,382,470 | A * | 1/1995 | Vicik | B32B 27/08 428/334 |
| 5,397,613 | A | 3/1995 | Georgelos et al. | |
| 5,449,552 | A * | 9/1995 | Bochow | B32B 27/32 428/323 |
| 5,629,059 | A | 5/1997 | Desai et al. | |
| 5,707,751 | A | 1/1998 | Garza et al. | |
| 5,716,715 | A * | 2/1998 | Degrassi | B32B 27/08 428/35.4 |
| 5,846,620 | A | 12/1998 | Compton et al. | |
| 5,939,158 | A * | 8/1999 | Plotzker | C08L 23/06 428/35.7 |
| 6,106,953 | A | 8/2000 | Zimmermann et al. | |
| 6,110,570 | A | 8/2000 | Paleari et al. | |
| 6,146,726 | A | 11/2000 | Yoshii et al. | |
| 6,203,750 | B1 | 3/2001 | Ahlgren et al. | |
| 6,245,437 | B1 * | 6/2001 | Shiiki | B32B 27/08 428/36.6 |
| 6,248,442 | B1 | 6/2001 | Kong et al. | |
| 6,274,228 | B1 | 8/2001 | Ramesh et al. | |
| 6,299,984 | B1 * | 10/2001 | Forloni | B32B 27/34 264/173.15 |

(Continued)

FOREIGN PATENT DOCUMENTS

| | | | | |
|---|---|---|---|---|
| CA | 1289324 | 9/1991 | | |
| CA | 2085813 | 6/1994 | | |
| CA | 2151677 | 1/1996 | | |
| CA | 2321084 | 9/1999 | | |
| CA | 2347031 | 5/2000 | | |
| EP | 2397325 A1 * | 12/2011 | ............. | B32B 27/08 |

OTHER PUBLICATIONS

Dupont (Adhesion Performance Comparison Table for DuPont Bynel Resins, 2009).*

(Continued)

*Primary Examiner* — Liam J Heincer
(74) *Attorney, Agent, or Firm* — Jones Day

(57) ABSTRACT

A multilayer plastic film comprising polyethylene outer layers with inner layers of additional polyethylene adjacent to tie layers of adhesive bonded to a blended polyamide and polyvinyl alcohol core. This structure results in excellent oxygen and water barrier properties. The film can be coextruded in a blown film process that results in a durable barrier film without the sacrifice of optical properties. Film applications include, but are not limited to, food packaging such as bags, liners, pouches, shrink bags, and chubs. In certain embodiments, the film can also be used for food packaging, including packaging of meat, cheese, milk, condiments, salad dressings, or any other oxygen sensitive products.

7 Claims, 1 Drawing Sheet

(56) References Cited

U.S. PATENT DOCUMENTS

| | | | |
|---|---|---|---|
| 6,316,067 B1 | 11/2001 | Edwards et al. | |
| 6,342,282 B1 | 1/2002 | Yoshii et al. | |
| 6,406,763 B1 | 6/2002 | Wolf et al. | |
| 6,479,160 B1 | 11/2002 | Tsai et al. | |
| 6,511,688 B2* | 1/2003 | Edwards | B32B 27/08 426/130 |
| 6,524,720 B1* | 2/2003 | Shah | B32B 27/08 428/516 |
| 6,579,584 B1 | 6/2003 | Compton et al. | |
| 6,610,392 B1 | 8/2003 | Ramesh et al. | |
| 6,663,905 B1 | 12/2003 | Ennis et al. | |
| 6,689,851 B1* | 2/2004 | Rowland | C08F 8/00 526/223 |
| 6,787,220 B2 | 9/2004 | Wallace et al. | |
| 7,147,930 B2 | 12/2006 | Schell et al. | |
| 7,160,604 B2* | 1/2007 | Ginossatis | B29C 61/0616 428/212 |
| 7,200,977 B2 | 4/2007 | Ramesh et al. | |
| 7,501,168 B2 | 3/2009 | Schiffmann et al. | |
| 7,504,143 B2 | 3/2009 | Schief et al. | |
| 7,588,830 B2 | 9/2009 | Ahlgren et al. | |
| 7,687,123 B2 | 3/2010 | Broadus et al. | |
| 7,718,555 B1 | 5/2010 | Smith | B32B 27/32 442/394 |
| 7,727,604 B2 | 6/2010 | Schiffmann et al. | |
| 7,744,806 B2 | 6/2010 | Broadus et al. | |
| 7,993,713 B2 | 8/2011 | Ishii et al. | |
| 8,017,231 B1 | 9/2011 | Ahlgren et al. | |
| 8,021,759 B1 | 9/2011 | Ahlgren et al. | |
| 8,026,302 B2* | 9/2011 | Shibutani | C08L 29/04 428/500 |
| 8,039,070 B1 | 10/2011 | Sawall | B32B 7/06 426/243 |
| 8,178,210 B2 | 5/2012 | Forloni et al. | |
| 2003/0099851 A1* | 5/2003 | Mount, III | B32B 27/08 428/476.1 |
| 2006/0094810 A1* | 5/2006 | Kim | B32B 1/02 524/445 |
| 2006/0110554 A1* | 5/2006 | Bernig | B32B 27/08 428/35.2 |
| 2007/0031546 A1 | 2/2007 | Nelson et al. | |
| 2007/0054142 A1* | 3/2007 | Lee | B32B 7/12 428/522 |
| 2007/0087212 A1* | 4/2007 | Iyengar | B32B 7/06 428/474.4 |
| 2007/0154668 A1* | 7/2007 | Rhee | B32B 27/34 428/35.7 |
| 2007/0172614 A1* | 7/2007 | Lee | B32B 7/12 428/35.7 |
| 2008/0038547 A1* | 2/2008 | Kenback Ash | B32B 27/10 428/342 |
| 2008/0095960 A1 | 4/2008 | Schell et al. | |
| 2008/0113130 A1 | 5/2008 | Schell et al. | |
| 2008/0138478 A1* | 6/2008 | Ebner | B32B 27/32 426/415 |
| 2009/0029079 A1* | 1/2009 | Siddiqui | A23L 1/3172 428/34.8 |
| 2009/0035594 A1* | 2/2009 | Lee | B32B 7/12 428/476.9 |
| 2009/0263602 A1* | 10/2009 | Kitahara | B32B 27/00 428/36.6 |
| 2009/0269592 A1* | 10/2009 | Hakamata | B32B 27/08 428/446 |
| 2009/0298372 A1* | 12/2009 | Chou | B32B 27/08 442/288 |
| 2010/0003432 A1 | 1/2010 | Schiffman et al. | |
| 2010/0015423 A1 | 1/2010 | Schaefer et al. | |
| 2010/0034999 A1 | 2/2010 | Schiffmann et al. | |
| 2010/0143555 A1* | 6/2010 | Bonetti | B32B 27/30 426/415 |
| 2010/0296757 A1* | 11/2010 | Yuno | B32B 15/08 383/116 |
| 2011/0117341 A1* | 5/2011 | Yoshizaki | B32B 27/32 428/213 |
| 2011/0252745 A1* | 10/2011 | Breck | B32B 27/08 53/451 |
| 2011/0288266 A1* | 11/2011 | Kato | B32B 27/08 528/335 |
| 2012/0064269 A1* | 3/2012 | Vogt | B32B 7/12 428/35.7 |
| 2013/0052470 A1* | 2/2013 | Botros | B32B 27/08 428/476.3 |
| 2013/0092590 A1* | 4/2013 | Bellini | B32B 27/08 206/524.2 |
| 2014/0017428 A1* | 1/2014 | Omasa | B32B 7/12 428/35.7 |
| 2014/0290185 A1* | 10/2014 | Forzano | A01F 25/14 53/461 |

OTHER PUBLICATIONS

Igenia (Igenia Masterbatch features anti-block, 2006).*
Surpass Polyethylene (Octene Copolymer sLLDPE film resins, 2010.*
Bari et al., 2008, "Impact of Technology on Global Polyethylene Technology," Metallocene Catalyzed Polymers: Materials, Processing and Markets, Dec. 10, 2008, p. 351, at 351 and 358.
Mark et al., 2013, Encyclopedia of polymer science and technology, concise, John Wiley & Sons, 2013, p. 434.

* cited by examiner

| Layer | Composition |
|---|---|
| 1 | A first layer comprising a linear low density polyethylene, anti-block material, and slip material |
| 2 | A second layer comprising a linear low density polyethylene |
| 3 | A third layer comprising linear low density polyethylenes |
| 4 | A fourth layer comprising polyamide, and amorphous polyvinyl alcohol |
| 5 | A fifth layer comprising linear low density polyethylenes |
| 6 | A sixth layer comprising a linear low density polyethylene |
| 7 | A seventh layer comprising linear low density polyethylenes, and anti-block material, slip material |

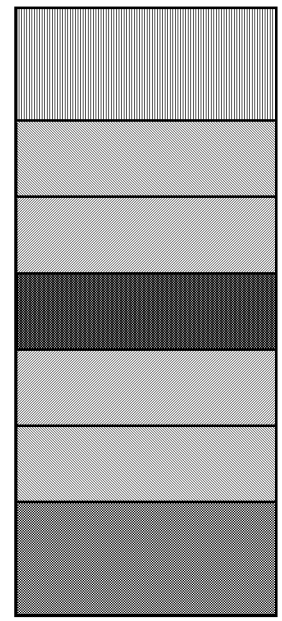

HIGH OXYGEN AND WATER BARRIER MULTILAYER FILM

This application claims the benefit of U.S. Provisional Application No. 61/724,329, filed Nov. 9, 2012, the entire contents of which is incorporated herein by reference.

FIELD

Provided herein are plastic films that provide an oxygen barrier and a water barrier for packaging products, such as those that require high oxygen and water barrier properties.

BACKGROUND

The related art consists of films that provide oxygen barriers through the use of ethylene vinyl alcohol copolymer (EVOH), or polyamide meta-xylene diamine (nylon MXD6). These materials provide high oxygen barriers; however, their barrier properties are diminished when exposed to water.

Oxygen and moisture barriers are key properties to preserve food products. Thus, food packers employ the use of barrier films throughout the industry. Packages include liners, bags, pouches, and wrappers in a wide variety of sizes and construction. A sufficient amount of barrier material is used in the package to prevent the degradation of the product for the desired shelf life. However, barrier raw materials are more expensive than other polymers in the film structure, so only the required amount is used in the structure, which can result in a lack of strength.

U.S. Pat. No. 6,479,160 B1 provides examples of oxygen barrier films using different layers, and blends of polymers to achieve the required barrier level for packaging oxygen sensitive foods. Another example is U.S. Pat. No. 4,792,488, which provides a multilayer film using a layer of vinylidene chloride copolymer and a layer of ethylene vinyl alcohol copolymer. A third example is U.S. Pat. No. 4,770,944, which provides a polymeric structure with a barrier layer that is heated under moist conditions to improve the oxygen barrier and moisture penetration. However, the oxygen barrier and moisture barrier properties of these materials are lacking, such that there is a need for materials with improved oxygen barrier and moisture barrier properties. The materials provided herein are believed to meet this need.

SUMMARY

The embodiments provided herein relate to plastic films. In certain embodiments, provided herein are films that provide high oxygen and water barriers. In other embodiments, provided herein are blown, thermoplastic coextruded films that provide high oxygen and water barriers. In one embodiment, provided herein are films with an oxygen barrier comprising polyvinyl alcohol.

In certain embodiments, provided herein are multilayer plastic films comprising polyethylene outer layers with inner layers of additional polyethylene adjacent to tie layers of adhesive bonded to a blended polyamide and amorphous polyvinyl alcohol core.

In a particular embodiment, a multilayer film provided herein comprises a first layer comprising a blend of a linear low density polyethylene, an anti-block material and a slip material, a second layer comprising a linear low density polyethylene, a third layer comprising a blend of one or more linear low density polyethylenes, a fourth layer comprising a blend of polyamide and amorphous polyvinyl alcohol, a fifth layer comprising a blend of one or more linear low density polyethylenes, a sixth layer comprising a linear low density polyethylene, and a seventh layer comprising a blend of one or more linear low density polyethylenes, an anti-block material and a slip material.

BRIEF DESCRIPTION OF THE DRAWINGS

The FIGURE Shows a cross-section of a blown, thermoplastic coextruded film comprising seven layers.

DETAILED DESCRIPTION

As shown in the FIGURE, in a particular embodiment, the first layer of the film provided herein as an embodiment comprises a single site catalyzed linear low density polyethylene (LLDPE) blended with a master batch of anti-block material and a master batch of slip material. Nova FPs117C is one such LLDPE, while Ingenia IP1091 anti-block and Ingenia IP1065 slip are examples of possible master batches that can be employed in the first layer.

Without being limited by theory, in the first layer, the LLDPE provides strength and a platform for the anti-block material, which prevents the outside of the film from sticking to itself when multiple sheets are in contact. Common situations where sticking could occur include when the film is wound into a roll or fashioned into a bag or pouch. The slip materials provide the desired coefficient of friction during film to film contact or film to metal contact. In certain embodiments, the coefficient of friction is in the range between about 0.05 to about 0.50, in one embodiment, between about 0.10 and about 0.25. In certain embodiments, the film can slide on materials, or allow materials to slide on it, without such low friction that the film cannot be held or such high friction that the film wrinkles.

The second layer is comprised of an octene linear low density polyethylene, such as FP120D available from Nova.

The third layer is comprised of a blend of super hexene LLDPE and maleic anhydride grafted linear low density polyethylene (MAH modified LLDPE). ExxonMobil NTX-101 is a suitable super hexene LLDPE, while DuPont Bynel 4164 is a suitable MAH modified LLDPE.

Without being limited by theory, these first 3 layers provide a moisture barrier to keep water from passing into and through the film.

The fourth layer is comprised of a blend of polyamide (PA) and polyvinyl alcohol (PVA). In one embodiment, the PVA is amorphous. A function of this layer is to provide oxygen barrier property to the film. In one embodiment, the PA is comprised of polyamide 6.66. BASF C40 PA and Soarus OKS-8049P PVA can be used to make the fourth layer of the film. In one embodiment, the fourth layer is the oxygen barrier layer.

The fifth layer is comprised of a blend of super hexene LLDPE and MAH modified LLDPE. ExxonMobil NTX-101 is a suitable super hexene LLDPE, while DuPont Bynel 4164 is a suitable MAH modified LLDPE.

The sixth layer is comprised of an octene linear low density polyethylene, such as FP120D available from Nova.

The seventh layer is comprised of a blend of octene linear low density polyethylene, metallocene catalyzed linear low density polyethylene, a master batch of anti-block and a master batch of slip materials. Nova FP120D is one such octene LLDPE, ExxonMobil 1012HA is a suitable metallocene catalyzed LLDPE, while Ingenia IP1091 anti-block and Ingenia IP1065 slip are examples of possible master batches that can be used in the seventh layer.

In certain embodiments, the first layer is the inner layer and the seventh layer is the outer layer.

In certain embodiments, the films provided herein have an oxygen barrier comprising polyvinyl alcohol. Without being limited by theory, it is believed that films provided herein having an oxygen barrier comprising polyvinyl alcohol provide about 10 to 15 times the oxygen barrier than films without an oxygen barrier comprising polyvinyl alcohol.

Without being limited by theory, it is thought that the structure of LLDPE and additive outer layers with a core of PA and PVA provides a high oxygen and water barrier film.

In certain embodiments, provided herein are methods for using films provided herein as bags, liners, pouches, shrink bags, and chubs. In certain embodiments, the film can also be used for food packaging, including packaging of meat, cheese, milk, condiments, salad dressings, or any other oxygen sensitive products.

Example 1

A film was made with the following structure:

| Layer | % Thickness | | Description |
|---|---|---|---|
| 1 | 20.00% | | |
| | | Nova FPs117C | Single Site Catalyzed LLDPE |
| | | Ingenia IP1091 | Anti-block Masterbatch |
| | | Ingenia IP1065 | Slip Masterbatch |
| 2 | 15.00% | | |
| | | Nova FP120D | Octene LLDPE |
| 3 | 10.00% | | |
| | | ExxonMobil NTX-101 | Super Hexene LLDPE |
| | | DuPont Bynel 4164 | MAH Modified LLDPE |
| 4 | 10.00% | | |
| | | BASF C40 | Polyamide |
| | | Soarus OKS-8049P | PVA |
| 5 | 10.00% | | |
| | | ExxonMobil NTX-101 | Super Hexene LLDPE |
| | | DuPont Bynel 4164 | MAH Modified LLDPE |
| 6 | 15.00% | | |
| | | Nova FP120D | Octene LLDPE |
| 7 | 20.00% | | |
| | | Nova FP120D | Octene LLDPE |
| | | ExxonMobil 1012HA | Metallocene Catalyzed LLDPE |
| | | Ingenia IP1091 | Anti-block Masterbatch |
| | | Ingenia IP1065 | Slip Masterbatch |

The film was produced at a total average thickness of 4.5 mils with the first layer averaging 0.90 mils, the second layer averaging 0.68 mils, the third layer averaging 0.45 mils, the fourth layer averaging 0.45 mils, the fifth layer averaging 0.45 mils, the sixth layer averaging 0.68 mils, and the seventh layer averaging 0.90 mils. The desired range is +/−10% for both the total film thickness and the thicknesses of each layer. In certain embodiments, the films provided herein can be made using blown film, cast film, or double bubble processes.

Film Properties:

In one embodiment, the oxygen transmission rate ("OTR") was measured using ASTM D-3985 at 73° F. at three different levels of relative humidity, three times each with the following results:

| | OTR ($cc/m^2/day$) | | |
|---|---|---|---|
| Relative Humidity (%) | Measurement 1 | Measurement 2 | Measurement 3 |
| 50 | 0.286 | 0.496 | 0.263 |
| 75 | 0.491 | 1.250 | 0.666 |
| 90 | 1.650 | 3.396 | 2.006 |

In certain embodiments, films provided herein have an OTR ($cc/m^2/day$) of less than about 25, less than about 20, less than about 15, less than about 10, less than about 5, less than about 4, less than about 3, less than about 2, less than about 1 or less than about 0.5 at a relative humidity of 50% as measured using ASTM D-3985.

In certain embodiments, films provided herein have an OTR ($cc/m^2/day$) of less than about 25, less than about 20, less than about 15, less than about 10, less than about 5, less than about 4, less than about 3, less than about 2, less than about 1.5, less than about 1 or less than about 0.5 at a relative humidity of 75% as measured using ASTM D-3985.

In certain embodiments, films provided herein have an OTR ($cc/m^2/day$)] of less than about 25, less than about 20, less than about 15, less than about 10, less than about 5, less than about 4, less than about 3, less than about 2 or less than about 1 at a relative humidity of 90% as measured using ASTM D-3985.

Example 2

A film was made similar to example 1, except no PVA was added to the fourth layer of the film.

The film was produced at a total average thickness of 4.5 mils with the first layer averaging 0.90 mils, the second layer averaging 0.68 mils, the third layer averaging 0.45 mils, the fourth layer averaging 0.45 mils, the fifth layer averaging 0.45 mils, the sixth layer averaging 0.68 mils, and the seventh layer averaging 0.90 mils.

Film Properties:

The oxygen transmission was measured at 73° F. at three different levels of relative humidity, three times each with the following results:

| | OTR ($cc/m^2/day$) | | |
|---|---|---|---|
| Relative Humidity (%) | Measurement 1 | Measurement 2 | Measurement 3 |
| 50 | 48.745 | 55.701 | 54.017 |
| 75 | 49.892 | 56.508 | 55.586 |
| 90 | 52.709 | 58.884 | 58.558 |

Summary Table for Example 1 and Example 2 Test Results Comparison

| | Relative Humidity | OTR ($cc/m^2/day$) | | |
|---|---|---|---|---|
| Example | (%) | Measurement 1 | Measurement 2 | Measurement 3 |
| 1 | 50 | 0.286 | 0.496 | 0.263 |
| 1 | 75 | 0.491 | 1.250 | 0.666 |
| 1 | 90 | 1.650 | 3.396 | 2.006 |
| 2 | 50 | 48.745 | 55.701 | 54.017 |
| 2 | 75 | 49.892 | 56.508 | 55.586 |
| 2 | 90 | 52.709 | 58.884 | 58.558 |

The film of Example 1 provides an oxygen barrier and a water barrier. The film of Example 2 does not provide a desirable shelf life and leads to undesirable conditions in the end use, such as food spoilage, odor, and bacteria growth, because of the high OTR of the film.

The invention claimed is:

1. A multilayer film comprising:
   A first layer comprising a blend of a linear low density polyethylene, an anti-block material and a slip material;

A second layer comprising a linear low density polyethylene;

A third layer comprising a blend of one or more linear low density polyethylenes;

A fourth layer comprising a blend of polyamide and amorphous polyvinyl alcohol;

A fifth layer comprising a blend of one or more linear low density polyethylenes;

A sixth layer comprising a linear low density polyethylene; and

A seventh layer comprising a blend of one or more linear low density polyethylenes, an anti-block material and a slip material, wherein the polyamide comprises polyamide 6,66.

2. The film of claim 1 wherein the linear low density polyethylene in the first layer comprises a single site catalyzed linear low density polyethylene.

3. The film of claim 1 wherein the linear low density polyethylene in the second layer comprises an octene linear low density polyethylene.

4. The film of claim 1 wherein the third layer comprises a blend of a super hexene linear low density polyethylene and a maleic anhydride grafted linear low density polyethylene.

5. The film of claim 1 wherein the fifth layer comprises a blend of a super hexene linear low density polyethylene and a maleic anhydride grafted linear low density polyethylene.

6. The film of claim 1 wherein the sixth layer comprises an octene linear low density polyethylene.

7. The film of claim 1 wherein the seventh layer comprises a blend of an octene linear low density polyethylene, metallocene catalyzed linear low density polyethylene, an anti-block material and a slip material.

* * * * *